(12) United States Patent
Santana, Jr.

(10) Patent No.: US 7,323,846 B2
(45) Date of Patent: Jan. 29, 2008

(54) BATTERY HAVING AN EXTENDED TERMINAL

(75) Inventor: George L. Santana, Jr., New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/195,482

(22) Filed: Aug. 2, 2005

(65) Prior Publication Data
US 2005/0264259 A1  Dec. 1, 2005

Related U.S. Application Data

(62) Division of application No. 10/202,693, filed on Jul. 25, 2002, now Pat. No. 6,924,620.

(51) Int. Cl.
*H01M 10/46* (2006.01)
(52) U.S. Cl. ...................................... 320/107
(58) Field of Classification Search ............... 320/107, 320/110, 112, 114, 150, 111; 439/101, 504, 439/94
See application file for complete search history.

(56) References Cited

U.S. PATENT DOCUMENTS

| | | | |
|---|---|---|---|
| 3,518,524 A | 6/1970 | Roszyk | |
| 4,578,628 A | 3/1986 | Siwiak | |
| 4,680,527 A | 7/1987 | Benenati et al. | |
| 5,092,799 A * | 3/1992 | Kimura | 439/60 |
| 5,505,632 A * | 4/1996 | Hayashi et al. | 439/318 |
| 5,637,977 A * | 6/1997 | Saito et al. | 320/109 |
| 5,653,596 A * | 8/1997 | Banakis et al. | 439/64 |
| 5,909,101 A * | 6/1999 | Matsumoto et al. | 320/110 |
| 6,057,608 A | 5/2000 | Bailey, Jr. et al. | |
| 6,075,341 A | 6/2000 | White et al. | |
| 6,259,230 B1 | 7/2001 | Chou | |
| 6,316,915 B1 | 11/2001 | Fujiwara et al. | |
| 6,326,766 B1 | 12/2001 | Small | |
| 6,326,767 B1 | 12/2001 | Small et al. | |
| 6,329,793 B1 | 12/2001 | Bertness et al. | |
| 6,331,763 B1 | 12/2001 | Thomas et al. | |
| 6,525,511 B2 | 2/2003 | Kubale et al. | |
| 2001/0017531 A1 * | 8/2001 | Sakakibara et al. | 320/106 |
| 2002/0074973 A1 * | 6/2002 | Brotto | 320/150 |

FOREIGN PATENT DOCUMENTS

| | | |
|---|---|---|
| WO | WO 99/23738 | 5/1999 |
| WO | WO 02/03525 | 1/2002 |

* cited by examiner

*Primary Examiner*—Edward H Tso
(74) *Attorney, Agent, or Firm*—Michael Best & Friedrich LLP

(57) ABSTRACT

A battery, a battery charger, an electrical system, and a method of charging a battery. In one aspect, the battery includes a housing, a battery cell supported by the housing, a first terminal electrically connected to the battery cell and having a first terminal end, and a second terminal electrically connected to the battery cell and having a second terminal end, the second terminal end extending forwardly of the first terminal end. In another aspect, the battery charger includes a charger housing, a charging circuit supported by the charger housing and connectable to a power source, a first charger terminal connected to the charging circuit and having a first charger terminal end, the first charger terminal being connectable to the first battery terminal, and a second charger terminal connected to the charging circuit and having a second charger terminal end, the second charger terminal being connectable to the second battery terminal, the second charger terminal end extending forwardly of the first charger terminal end.

17 Claims, 10 Drawing Sheets

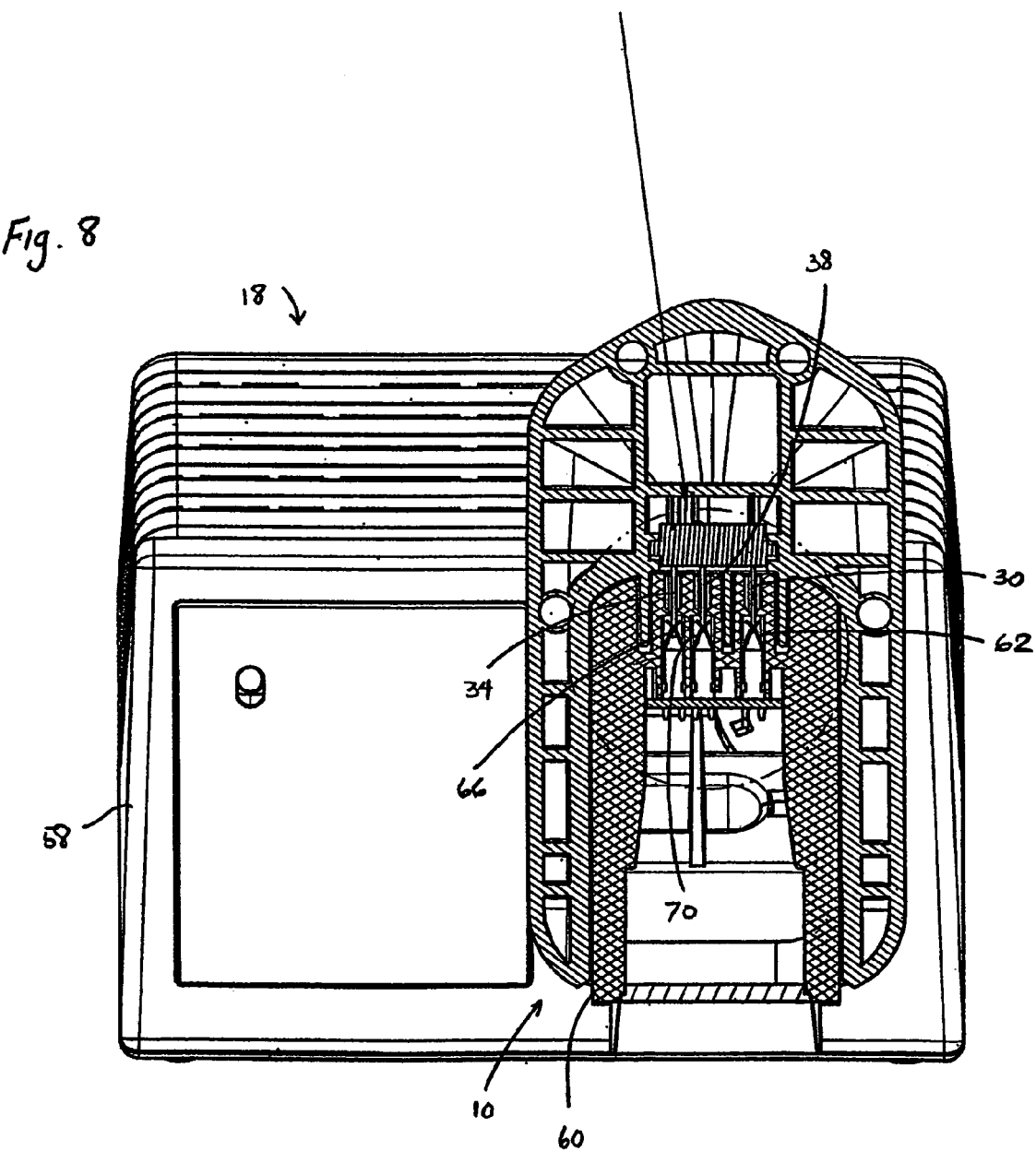

BATTERY HAVING AN EXTENDED TERMINAL

RELATED APPLICATIONS

This application is a divisional of and claims priority to U.S. patent application Ser. No. 10/202,693, filed Jul. 25, 2002, now U.S. Pat. No. 6,924,620, the entire contents of which are incorporated herein by reference.

FIELD OF THE INVENTION

The present invention relates to batteries and, more particularly, to rechargeable batteries.

BACKGROUND OF THE INVENTION

Typically, electrical equipment, such as, cordless power tools, are powered by a rechargeable battery that is periodically charged in a compatible battery charger. To charge the battery, the battery terminals are connected to the charger terminals to connect the battery cell(s) to the charging circuit, and the charging circuit is connected to a power source to selectively supply power to the battery cell to charge the battery cell.

SUMMARY OF THE INVENTION

Existing batteries include battery terminals having battery terminal ends which are aligned. Similarly, existing battery chargers include charger terminals having charger terminal ends which are aligned. One independent problem with existing batteries and existing battery chargers is that, when the battery is connected to the battery charger with the battery charger connected to the power source (i.e., a "hot plug"), if the battery power terminal is connected to the corresponding charger terminal before the battery ground terminal is connected to the corresponding charger terminal, the battery charger and/or the battery may be damaged (i.e., the components of the charging circuit, such as, for example, a microprocessor or microcontroller, may be damaged). Such a connection can occur if the battery is connected to the battery charger in a canted or angled orientation. In such a case, the battery may ground through another charger terminal, such as a thermistor terminal.

Another independent problem with existing batteries and existing battery chargers is that, even if the battery power and ground terminals are connected simultaneously with the corresponding charger terminals, the battery charger and/or the battery may also be damaged (i.e., the positive terminal may deteriorate).

Yet another independent problem with some existing battery chargers is that the battery charger cannot accommodate a battery having different battery terminal lengths or batteries having different battery terminal lengths from each other.

The present invention provides a battery, a battery charger, an electrical system and a method of charging a battery which substantially alleviate one or more of the above-described and other problems with existing batteries, battery chargers and battery charging procedures. In some aspects, the battery of the present invention includes a battery ground terminal having an end which extends forwardly of the ends of the other battery terminal(s) (i.e., a "hot plug" gap is provided between the extended battery ground terminal and the other battery terminals). In some aspects, the battery charger of the present invention includes an extended charger ground terminal providing a "hot plug" gap between the extended charger ground terminal and the other charger terminals. The "hot plug" gap enables the battery to be connected to the battery charger while the battery charger is connected to a power source without the battery or the battery charger being damaged by such a "hot plug".

More particularly, the present invention provides a battery comprising a housing, a battery cell supported by the housing, a first terminal electrically connected to the battery cell and having a first terminal end, and a second terminal electrically connected to the battery cell and having a second terminal end, the second terminal end extending forwardly of the first terminal end.

Preferably, the battery further comprises a third terminal electrically connected to the battery cell. The third terminal has a third terminal end, and the second terminal end preferably extends forwardly of the third terminal end. Also, the battery may further comprise a temperature monitoring device, such as a thermistor, electrically connected to the third terminal. In addition, the first terminal may be positive current terminal, and the second terminal is preferably a ground terminal. The battery cell may be a NiMH battery cell, a NiCd battery cell, a Li-ion battery cell or a battery cell having another chemistry.

Also, the present invention provides an electrical system comprising a battery and a battery charger. The battery includes a housing, a battery cell supported by the housing, a first battery terminal electrically connected to the battery cell and having a first battery terminal end, and a second battery terminal electrically connected to the battery cell and having a second battery terminal end. The battery charger includes a charger housing, a charging circuit supported by the charger housing and connectable to a power source, a first charger terminal connected to the charging circuit having a first charger terminal end, the first charger terminal being connectable to the first battery terminal, and a second charger terminal connected to the charging circuit having a second charger terminal end, the second charger terminal being connectable to the second battery terminal. One of the second battery terminal end and the second charger terminal end extends forwardly of the first battery terminal end and first charger terminal end, respectively.

In some aspects, the second battery terminal end extends forwardly of the first battery terminal end. In some aspects, the second charger terminal end extends forwardly of the first charger terminal end.

In addition, the present invention provides an electrical system comprising a battery and a battery charger. The battery includes a housing, a battery cell supported by the housing, a first battery terminal electrically connected to the battery cell and having a first battery terminal end, and a second battery terminal electrically connected to the battery cell and having a second battery terminal end, the second battery terminal end extending forwardly of the first terminal end. The battery charger includes a charger housing, a charging circuit supported by the charger housing and connectable to a power source, a first charger terminal connected to the charging circuit and connectable to the first battery terminal, and a second charger terminal connected to the charging circuit and connectable to the second battery terminal.

Further, the present invention provides an electrical system comprising a battery and a battery charger. The battery includes a housing, a battery cell supported by the housing, a first battery terminal electrically connected to the battery cell, and a second battery terminal electrically connected to the battery cell. The battery charger includes a charger housing, a charging circuit supported by the charger housing and connectable to a power source, a first charger terminal connected to the charging circuit having a first charger terminal end, the first charger terminal being connectable to the first battery terminal, and a second charger terminal connected to the charging circuit having a second charger terminal end, the second charger terminal being connectable to the second battery terminal, the second terminal end extending forwardly of the first charger terminal end.

Also, the present invention provides a method of charging a battery with a battery charger. The battery includes a housing, a battery cell supported by the housing, a first battery terminal electrically connected to the battery cell, and a second battery terminal electrically connected to the battery cell. The battery charger includes a charger housing, a charging circuit supported by the charger housing connectable to a power source, a first charger terminal connected to the charging circuit, and a second charger terminal connected to the charging circuit. The method is defined as comprising the acts of connecting the second battery terminal to the second charger terminal, and, after the act of connecting the second battery terminal to the second charger terminal, connecting the first battery terminal to the first charger terminal.

One independent advantage of the present invention is that the extended terminal of the battery or the charger is connected to the corresponding terminal of the other of the battery or the charger before the other terminal(s) are connected to the other corresponding terminal(s). This "hot plug" gap ensures that the extended terminal end connects to the corresponding terminal before the other terminal ends connect to the other corresponding terminal ends even if the battery is connected to the charger in a canted or angled orientation. This prevents damage to the battery charger and/or to the battery.

Another independent advantage of the present invention is that the "hot plug" gap provided by the extended terminal prevents damage and deterioration which may occur if the battery power and ground terminals were to connect simultaneously with the corresponding charger terminals.

Yet another independent advantage of the present invention is that, in some aspects, the battery charger can accommodate a battery having different battery terminal lengths or batteries having different battery terminal lengths from each other.

Other independent features and independent advantages of the present invention will become apparent to those skilled in the art upon review of the following detailed description, claims and drawings.

BRIEF DESCRIPTION OF THE DRAWINGS

FIG. 8 is a cross-sectional view a portion of the battery and the charger taken generally along line 8-8 in FIG. 5.

Figure 1:
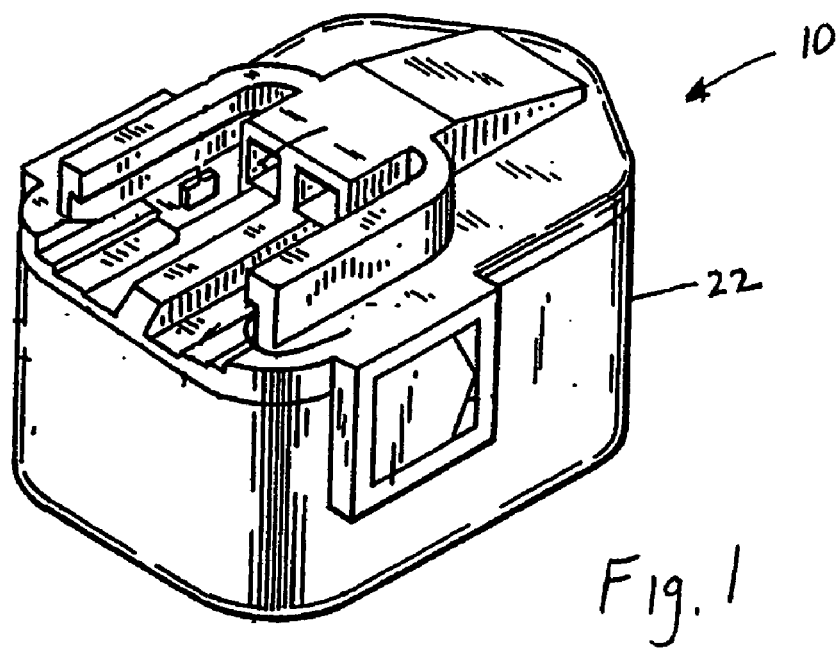
FIG. 1 is a perspective view of a battery embodying an aspect of the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

Figure 4:
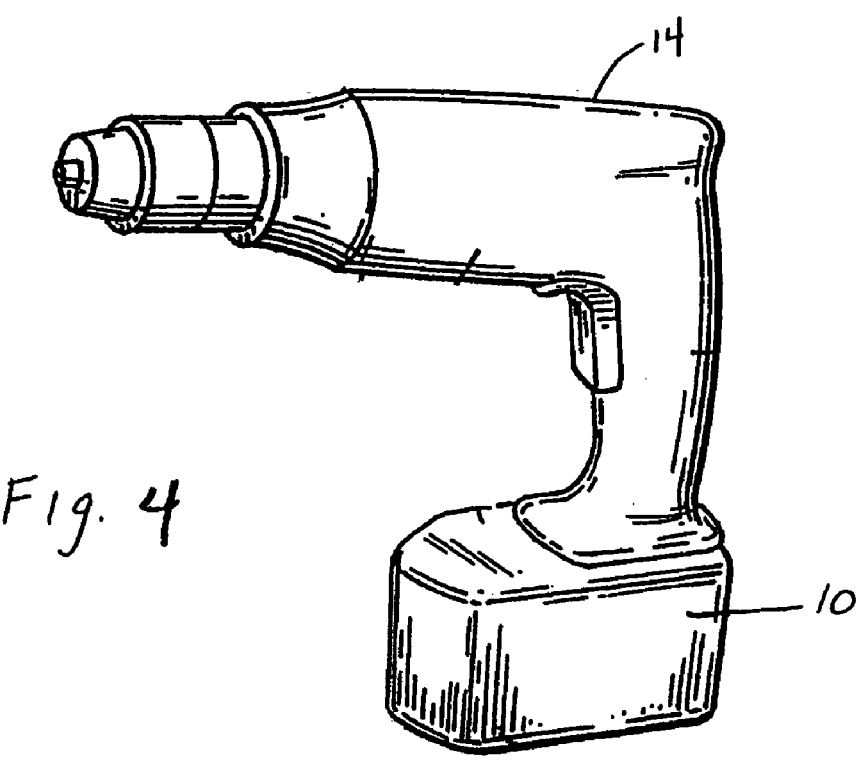
FIG. 4 is a perspective view of a power tool connected to the battery shown in FIG. 1.

A battery 10 embodying an aspect of the invention is illustrated in FIG. 1. The battery 10 is connectable to electrical equipment, such as, for example, a cordless power tool 14 (shown in FIG. 4) to selectively power the power tool 14. The battery 10 is removable from the power tool 14 and is preferably rechargeable by a battery charger 18 (shown in FIG. 5).

Figure 2:
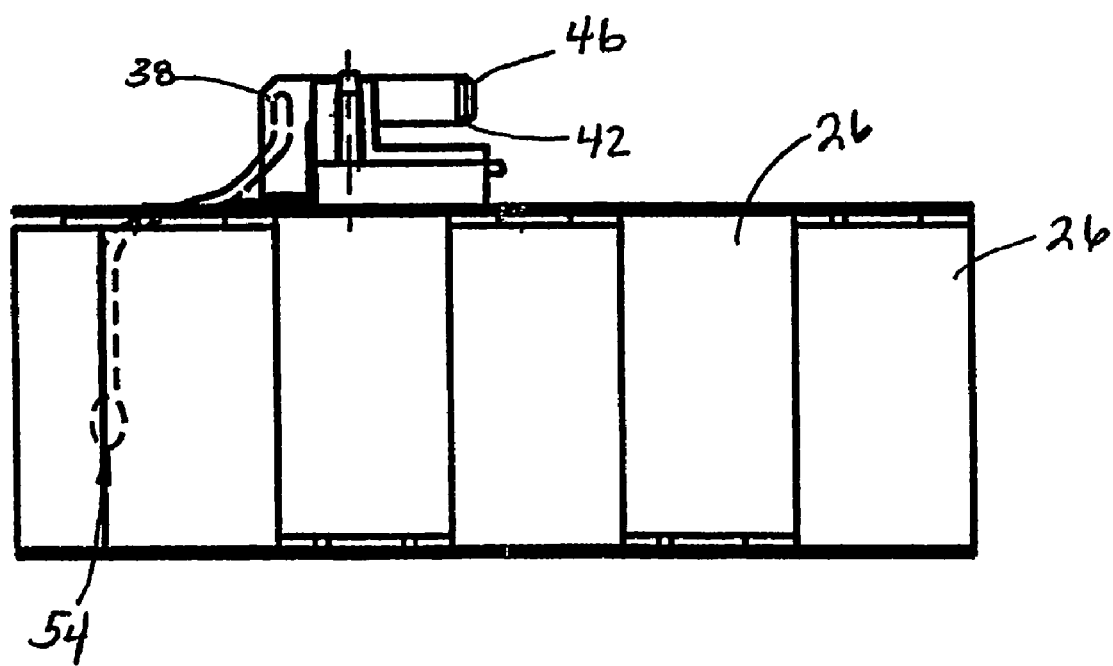
FIG. 2 is a side view of the battery shown in FIG. 1 with portions removed and illustrating an extended battery terminal end.
Figure 3:
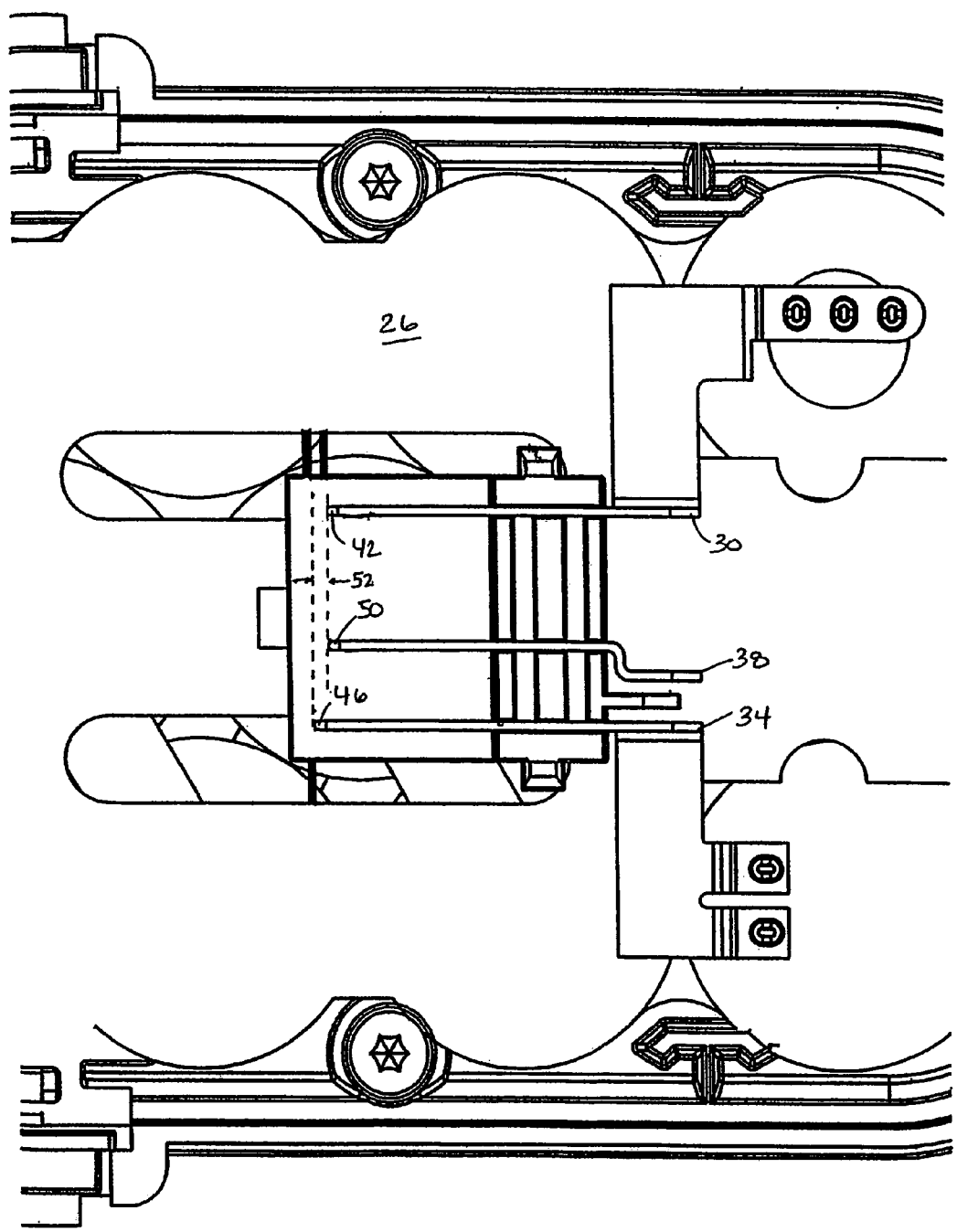
FIG. 3 is an enlarged plan view of the battery as shown in FIG. 2 and illustrating the extended battery terminal end.

As shown in FIGS. 1-3, the battery 10 includes a housing 22 and at least one rechargeable battery cell 26 supported by the housing 22. In the illustrated construction, the battery 10 is an 18V battery pack including fifteen approximately 1.2V battery cells 26 connected in series. In other constructions (not shown), the battery 10 may provide another voltage, such as, for example, 12V, 14.4V, 24V, etc., to power the electrical equipment. The battery cell 26 may be any rechargeable battery cell chemistry type, such as, for example, nickel cadmium (NiCd), nickel metal-hydride NiMH) or lithium ion (Li-ion). It should be understood that, in other constructions (not shown), the battery cells 26 may have a different nominal cell voltage and/or may be connected in another configuration, such as, for example, in parallel or in a parallel/series combination.

As shown in FIG. 3, the battery 10 also includes a first or positive battery terminal 30, a second or ground battery terminal 34, and, in the illustrated construction, a third battery terminal 38. Each battery terminal 30, 34 and 38 is electrically connected to the battery cell 26 and may be electrically connectable to the electrical circuit of the power tool 14 and of the battery charger 18. Each battery terminal 30, 34 and 38 has a corresponding open terminal end 42, 46 and 50, respectively. In the illustrated construction, the third battery terminal 38 is electrically connected to a temperature monitoring device, such as a thermistor 54 (illustrated in FIG. 2), which monitors the temperature of the battery 10 and/or of the battery cells 26 during charging and/or during operation to prevent overheating and damage to battery and/or to the battery cells 26.

As illustrated in FIG. 3, in some aspects of the invention, the second battery terminal end 46 extends forwardly of the first and third battery terminal ends 42 and 50 (and of the terminal ends of any other battery terminals (not shown) which may be provided). In the illustrated construction and in some aspects of the invention, a "hot plug" gap 52 is provided between the second battery terminal end 46 and the other battery terminal end(s) 42 (and 50, if provided). The "hot plug" gap 52 ensures that the ground battery terminal 34 connects to the corresponding terminal of the battery charger 18 before the other battery terminal(s) 30 (and 38, if provided) connect to the other corresponding terminal(s) of the battery charger 18. The "hot plug" gap 52 thus prevents damage to the battery charger 18 and/or to the battery 10 if the battery 10 is connected to the battery charger 18 when the battery charger 18 is connected to a power source (not shown) (i.e., a "hot plug").

Figure 5:
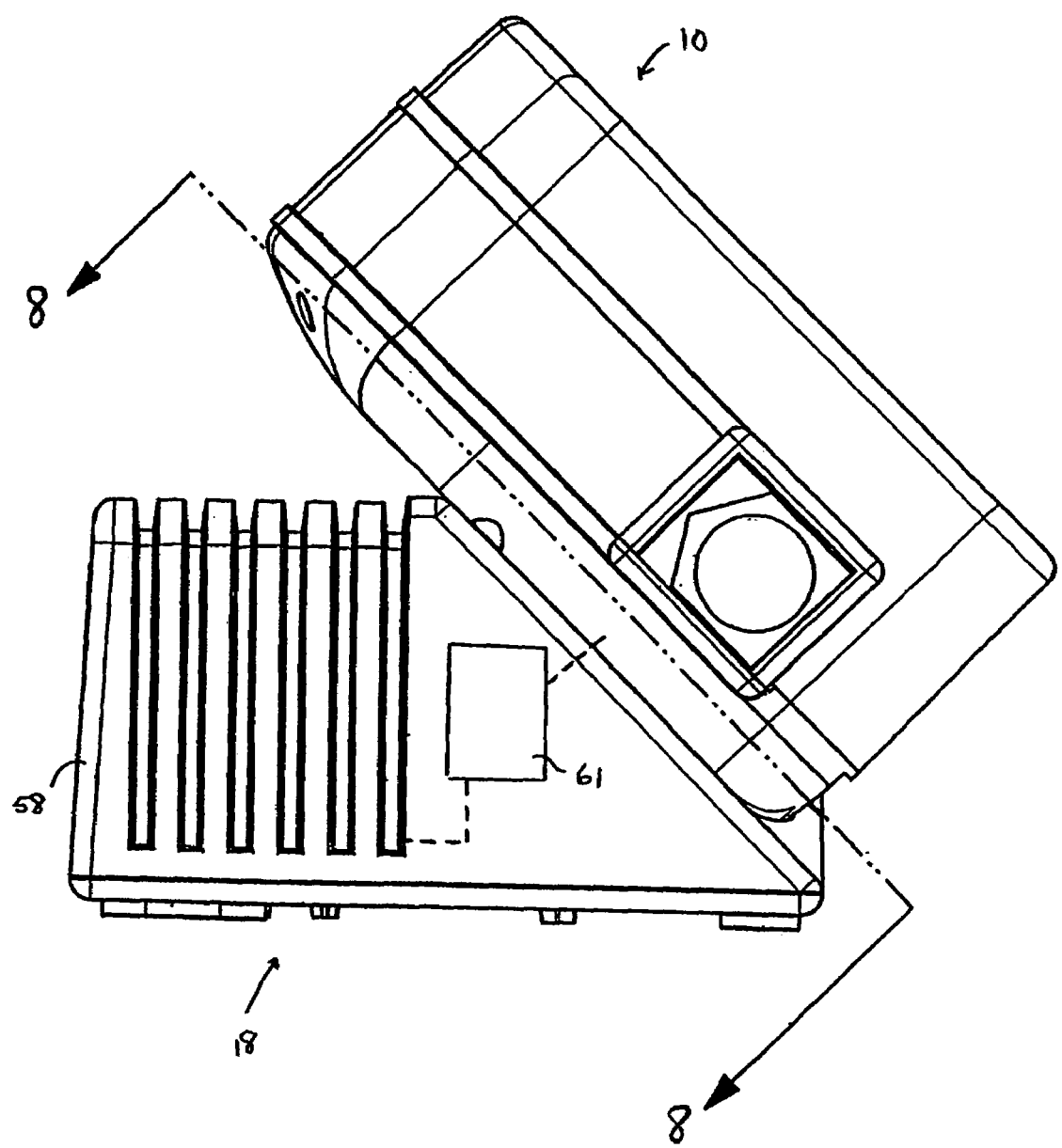
FIG. 5 is a side view of a battery connected to a battery charger.
Figure 6:
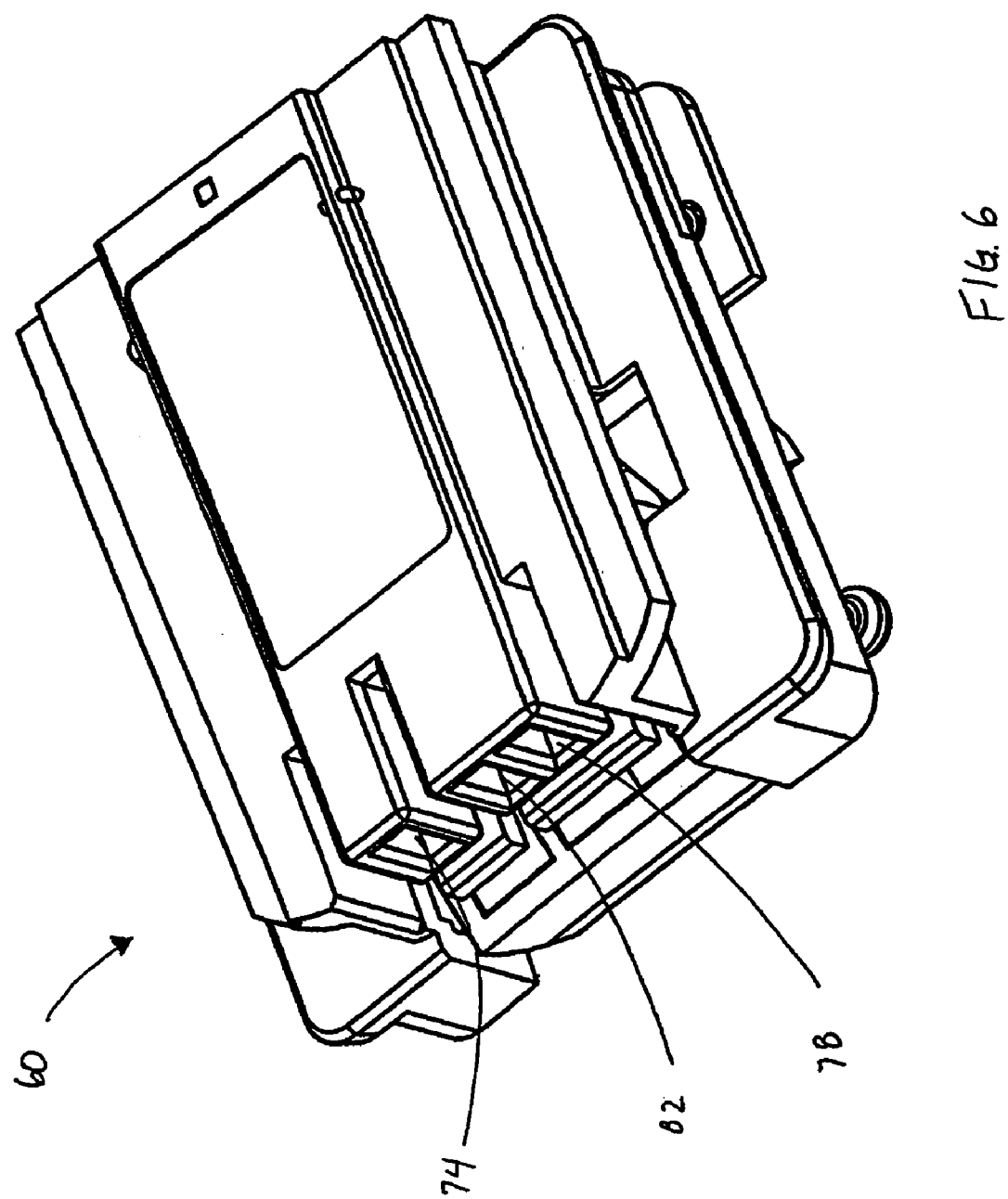
FIG. 6 is an enlarged perspective view of a charging port of the charger shown in FIG. 5.

As shown in FIG. 5, the battery charger 18 includes a housing 58 providing (see FIG. 6) a charging port 60 and supporting a charging circuit 61 (partially schematically illustrated in FIG. 5). The charging circuit 61 is connectable to the power source (not shown), such as, an AC power source (i.e., line) or a DC power source, and to the battery 10 to transfer power from the power source to the battery 10 to charge the battery cells 26. The charging circuit 61 may be similar to the charging circuit described in U.S. Pat. No. 6,222,343, issued Apr. 24, 2001, and U.S. patent application Ser. No. 09/672,620, filed Sep. 29, 2000, which are incorporated herein by reference.

The charging circuit 61 is preferably capable of charging different types of batteries (i.e., different battery voltages and/or different battery cell chemistries) and capable of operating on alternate sources of AC power or alternate sources of DC power. Also, the charging circuit 61 preferably will not operate if one of the power source, the battery, the power switch means (not shown) and the control means (not shown) (including a microprocessor or a microcontroller) malfunctions. In addition, in the charging circuit 61, the battery 10 under charge preferably enables the operation of the charging circuit 61, such as, by providing power to the microprocessor or microcontroller.

Figure 7:
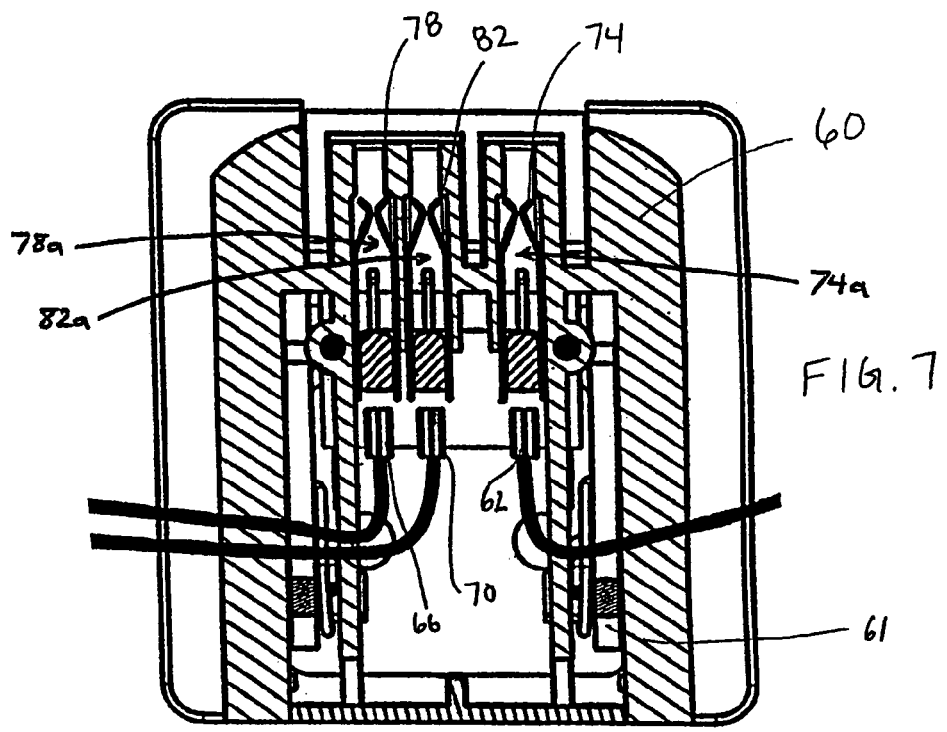
FIG. 7 is an enlarged cross-sectional view of the charging port shown in FIG. 6.
Figure 9:
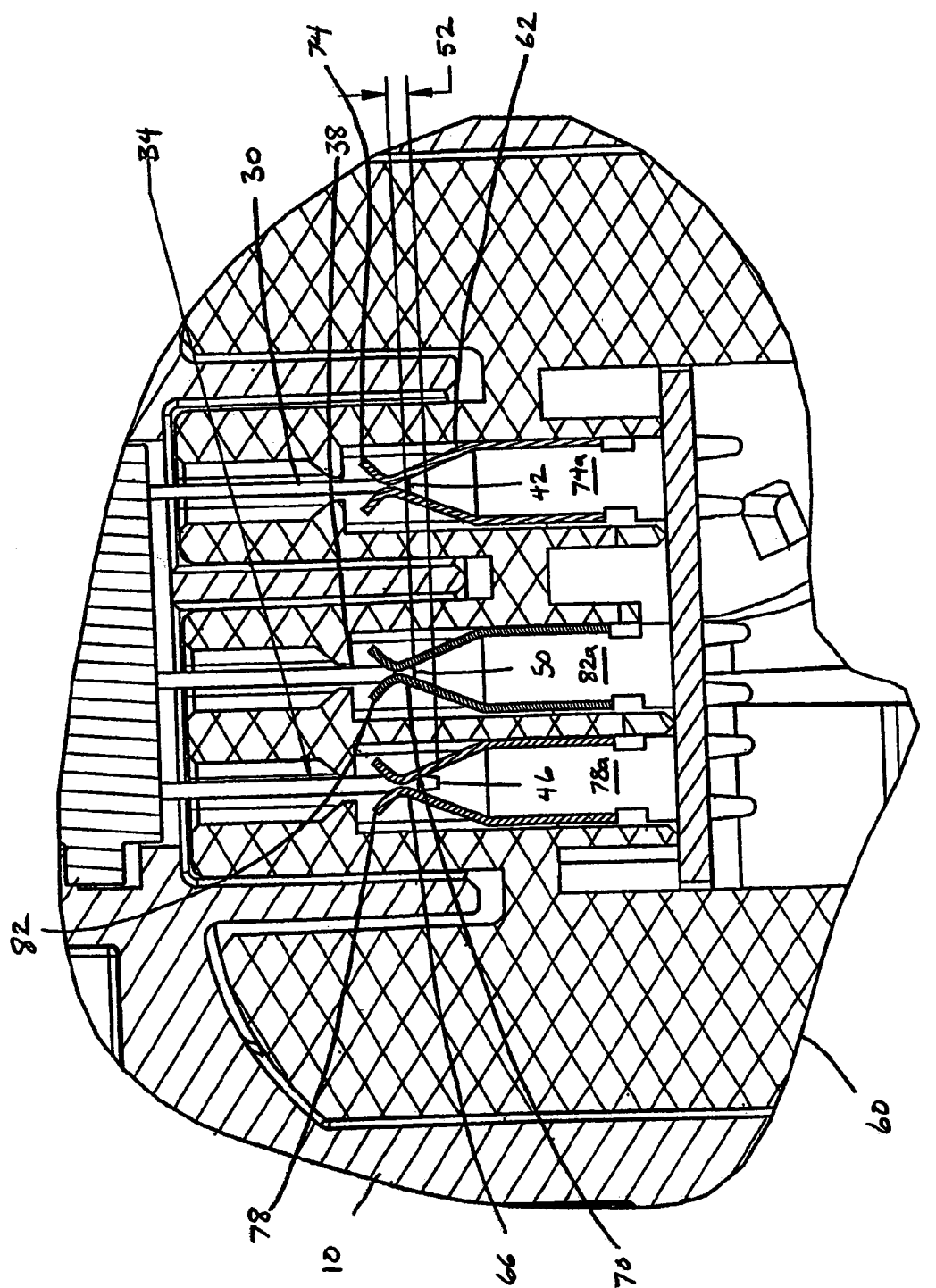
FIG. 9 is an enlarged cross-sectional view of a portion of the battery and the charger shown in FIG. 8.

As shown in FIGS. 7-9, the charging port 60 supports a first charger terminal 62, a second charger terminal 66, and, in the illustrated construction, a third charger terminal 70. The charger terminals 62, 66 and 70 are connected to the charging circuit 61 and are connectable to the corresponding battery terminals 30, 34 and 38, respectively, to supply power from the power source to the battery cells 26 to charge the battery cells 26. Each charger terminal 62, 66 and 70 has a corresponding charger terminal end 74, 78 and 82, respectively (illustrated in FIGS. 7-9). The third charger terminal 70 is connectable to the third battery terminal 38 and connects the thermistor 54 to a temperature monitoring device (not shown) in the charger 18, such as, for example, a microprocessor or a microcontroller, to monitor the temperature of the battery 10 and/or of the battery cells 26 during charging.

In the illustrated construction, the charger terminals 62, 66 and 70 are female terminals defining terminal pockets 62a, 66a and 70a, respectively. The charger terminals 62, 66 and 70 can accommodate (and connect to the charging circuit 61) battery terminals having different lengths (i.e., the battery terminals 30, 34 and 38). Also, the charger terminals 62, 66 and 70 can accommodate battery terminals having ends which are aligned (such as those shown in FIG. 11) so that the charger 18 can also be used to charge the battery 10A (shown in FIG. 11). In addition, the charger terminals 62, 66 and 70 can accommodate battery terminals which are longer than the battery terminals 30, 34 and 38.

In the illustrated construction, the battery 10 is charged by supporting the battery 10 on the charging port 60 and connecting the battery cells 26 to the charging circuit 61. As the battery 10 is supported on the charging port 60 (the sequence shown in FIGS. 10A through 10C), the second battery terminal 34 is connected to the second charger terminal 66 (in FIG. 10B, the second battery terminal end 46 contacts the second charger terminal end 78) before the first battery terminal 42 is connected to the first charger terminal 62 (in FIG. 10C) (and before the third battery terminal 38 is connected to the third charger terminal 70). The charger 18 is connected to the power source to supply power to the battery 10 to charge the battery cells 26.

Figure 10A:
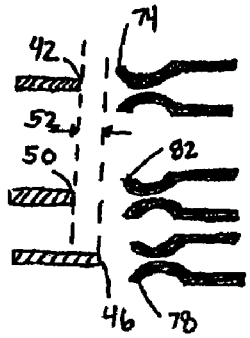
FIGS. 10A-10C are schematic views illustrating the connection of the battery terminals shown in FIG. 3 and the charger terminals shown in FIG. 7.
Figure 10B:
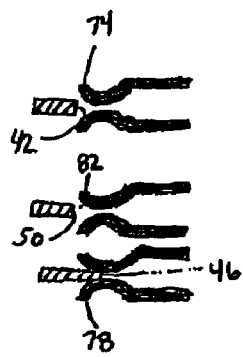
Figure 10C:
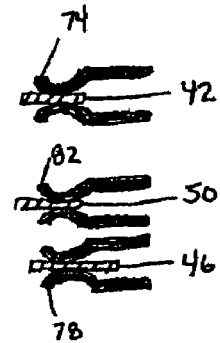

A "hot plug" exists when the charger 18 is connected to the power source before (or during) connection of the battery 10 to the charger 18 (and to the charging circuit 61). As schematically illustrated in FIGS. 10A-10B, the "hot plug" gap 52 between the extended second battery terminal end 46 and the other battery terminal end(s) 42 (and 50) ensures that the second (ground) battery terminal 46 connects the second (ground) charger terminal 66 before the other battery terminal end(s) 42 (and 50) contact the other charger terminal end(s) 74 (and 82), even if the battery 10 is positioned on the charging port 60 in a canted or angled orientation. Without the "hot plug" gap 52, the battery 10 may ground through another battery terminal, such as the thermistor terminal 38 (rather than through the ground terminal 34), and through a component of the charging circuit 61 (such as the microprocessor) which may be damaged by such grounding.

As discussed above, in the illustrated construction, the battery 10 preferably provides power to the charging circuit 61 (to the microprocessor) to enable operation of the charging circuit 61. When there is a "hot plug" condition, the supply of power from the battery 10 to the charging circuit 61 can cause further damage to the battery charger 18 (i.e., to the microprocessor) and/or to the battery 10 if power is supplied from the battery 10 to the charging circuit 61 (and to the microprocessor) before the battery 10 is grounded.

Figure 12:
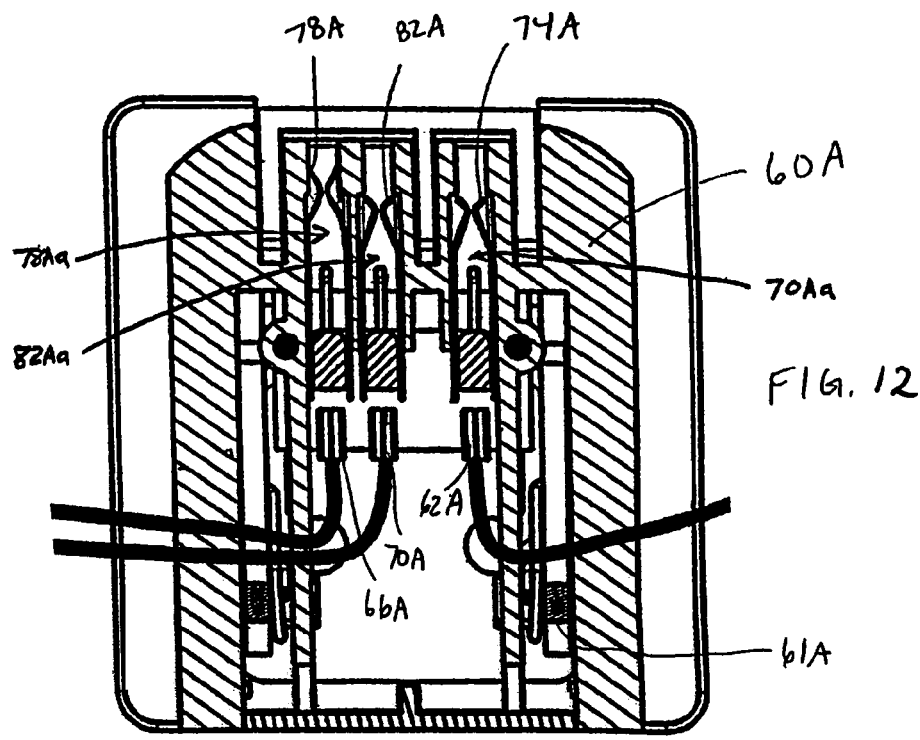
FIG. 12 is an enlarged cross-sectional view of an alternative construction of a portion of a battery charger embodying an aspect of the invention.
Figure 11:
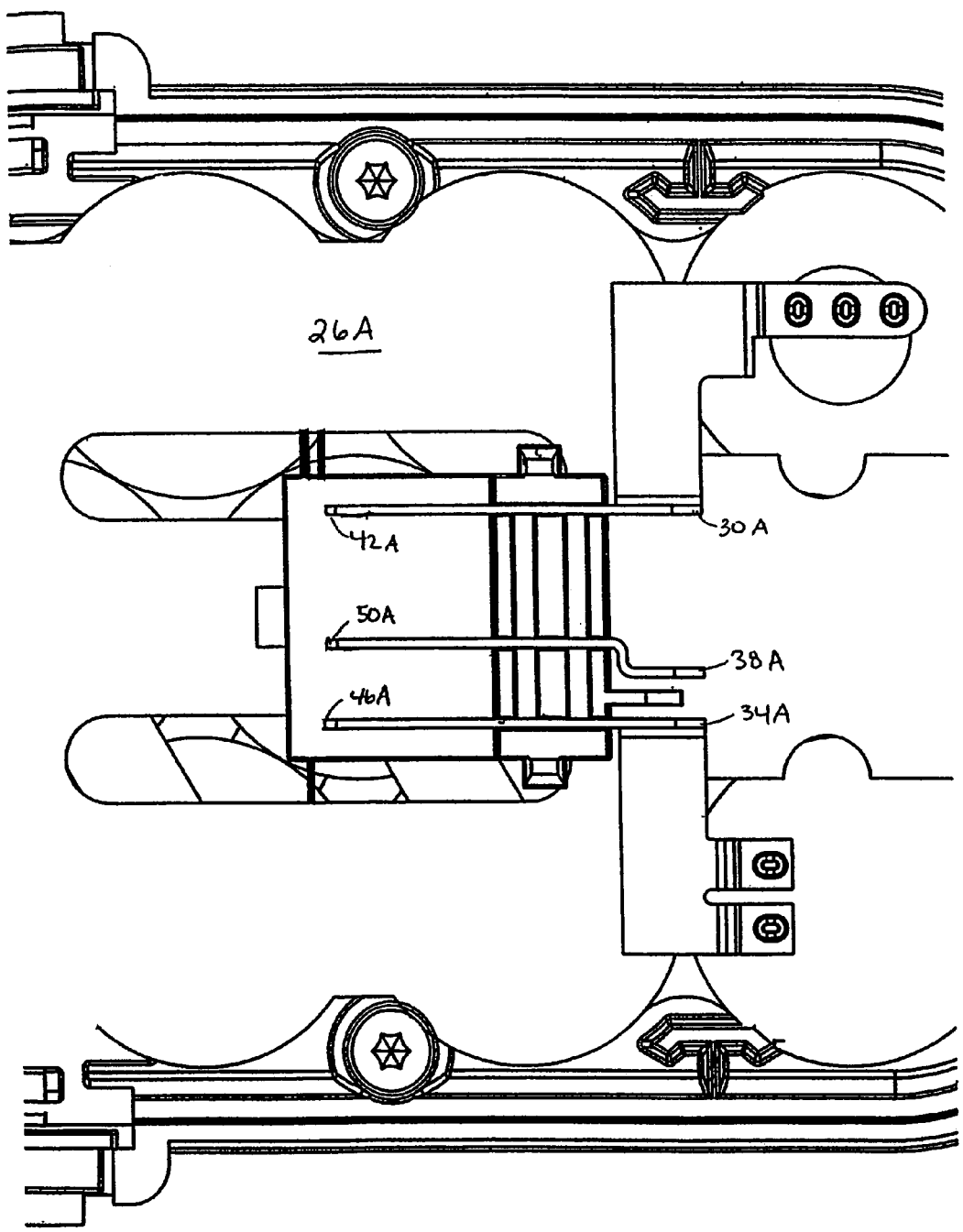
FIG. 11 is an enlarged plan view of an alternative construction of the battery having aligned battery terminal ends.

Alternative constructions of a battery 10A and a battery charger 18A are illustrated in FIGS. 11 and 12, respectively. Common elements are identified by the same reference number "A".

As shown in FIG. 11, the battery 10A battery terminals 30A, 34A and 38A having battery terminal ends 42A, 46A and 50A, respectively. In the illustrated construction, the battery terminal ends 42A, 46A and 50A are substantially aligned.

In the construction illustrated in FIG. 12 and in some aspects of the invention, the battery charger 18A includes charger terminals 62A, 66A and 70A having charger terminal ends 74A, 78A and 82A, respectively. In the illustrated construction and in some aspects of the invention, the second charger terminal end 78A extends forwardly of the other charger terminal end(s) 74A (and 82A, if provided) (and of the terminal ends of any other charger terminals (not shown) which may be provided).

In the illustrated construction and in some aspects of the invention, a "hot plug" gap 52A is provided between the second charger terminal end 78A and the other charger terminal end(s) 74A (and 82A, if provided). The "hot plug" gap 52A ensures that the ground battery terminal 34A (or the ground battery terminal 34) connects to the ground terminal 66A of the battery charger 18A before the other battery terminal(s) 30A (and 38A, if provided) (or the battery terminals 30 and 38) connect to the other corresponding terminal(s) of the battery charger 18A. The "hot plug" gap 52A thus prevents damage to the battery charger 18A and/or to the battery 10A (or the battery 10) if the battery 10A is connected to the battery charger 18A when the battery charger 18A is connected to a power source (not shown) (i.e., a "hot plug").

In the illustrated construction, the charger terminals 62A, 66A and 70A are also female terminals defining terminal pockets 62Aa, 66Aa and 70Aa, respectively. The charger terminals 62A, 66A and 70A can accommodate (and connect to the charging circuit 61A) battery terminals 30A, 34A and 38A having ends 42A, 46A and 50A which are aligned (as shown in FIG. 11). Also, the charger terminals 62A, 66A and 70A can accommodate battery terminals having different lengths (i.e., the battery terminals 30, 34 and 38) so that the charger 18A can also be used to charge the battery 10 (illustrated in FIGS. 1-3). In addition, the charger terminals 62A, 66A and 70A can accommodate battery terminals which are longer than the battery terminals 30A, 34A and 38A.

In the illustrated construction, the battery 10A (or the battery 10) is charged by supporting the battery 10A on the charging port 60A and connecting the battery cells 26A to the charging circuit 61A. As the battery 10A is supported on the charging port 60 (the sequence shown in FIGS. 13A through 13C), the second battery terminal 34A is connected to the second charger terminal 66A (in FIG. 13B, the second battery terminal end 46A contacts the second charger terminal end 78A) before the first battery terminal 42A is connected to the first charger terminal 62A (in FIG. 13C) (and before the third battery terminal 38A is connected to the third charger terminal 70A). The charger 18A is connected to the power source to supply power to the battery 10A to charge the battery cells 26A.

Figure 13A:
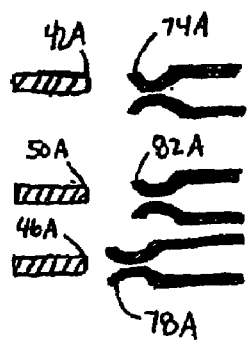
FIGS. 13A-13C are schematic views illustrating the connection of the charger terminals of the charging port shown in FIG. 12 and the battery terminals shown in FIG. 11.
Figure 13B:
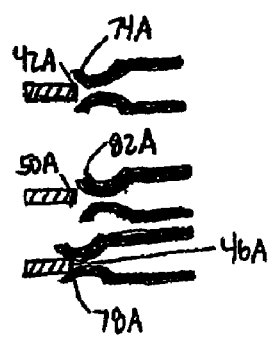
Figure 13C:
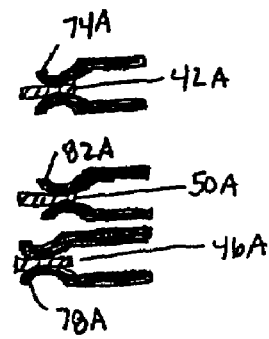

Again, a "hot plug" exists when the charger 18A is connected to the power source before (or during) connection of the battery 10A to the charger 18A (and to the charging circuit 61A). As schematically illustrated in FIGS. 13A-13B, the "hot plug" gap 52A between the extended second charger terminal end 66A and the other charger terminal end(s) 60A (and 70A) ensures that the second (ground) battery terminal 46A (or the second battery terminal 46) connects the second (ground) charger terminal 66A before the other battery terminal end(s) 42A (and 50A) (or the battery terminals 42 and 50) contact the other charger terminal end(s) 74A (and 82A), even if the battery 10A is positioned on the charging port 60A in a canted or angled orientation. Without the "hot plug" gap 52A, the battery 10A (or the battery 10) may ground through another battery terminal, such as the thermistor terminal 38A (rather than through the ground terminal 34A), and through a component of the charging circuit 61A (such as the microprocessor) which may be damaged by such grounding.

One or more of the above-described and other independent features and independent advantages of the invention are set forth in the following claims:

What is claimed is:

1. A battery comprising:
   a housing;
   a battery cell supported by the housing, the battery cell having a positive terminal and a ground terminal;
   a first terminal electrically connected to the positive terminal and having a first terminal end; and
   a second terminal electrically connected to the ground terminal and having a second terminal end configured to connect to a corresponding terminal of a battery charger before the first terminal end connects to a corresponding terminal of the battery charger.

2. The battery as set forth in claim 1, further comprising a third terminal electrically connected to the battery cell and having a third terminal end.

3. The battery as set forth in claim 2, wherein the second terminal end extends forwardly of the third terminal end.

4. The battery as set forth in claim 3, wherein the second terminal end extends forwardly of the first terminal end.

5. The battery as set forth in claim 2, further comprising a temperature monitoring device electrically connected to the third terminal.

6. The battery as set forth in claim 5, wherein the temperature monitoring device is a thermistor.

7. The battery as set forth in claim 1, wherein the battery cell is a NiMH battery cell.

8. The battery as set forth in claim 1, wherein the battery cell is a NiCd battery cell.

9. The battery as set forth in claim 1, wherein the battery cell is a Li-ion battery cell.

10. A battery comprising:
    a housing;
    a battery cell supported by the housing, the battery cell having a positive terminal and a ground terminal;
    a first battery terminal electrically connected to the positive terminal and extending along a first axis, the first battery terminal including a first terminal end in a first plane perpendicular to the first axis; and
    a second battery terminal electrically connected to the ground terminal and extending along a second axis, the second battery terminal including a second terminal end in a second plane perpendicular to the second axis, a gap being defined between the first plane and the second plane, the gap ensuring the second terminal end connects to a battery charger before the first terminal end connects to the battery charger.

11. The battery as set forth in claim 10, further comprising a third battery terminal electrically connected to the battery cell and having a third terminal end.

12. The battery as set forth in claim 11, wherein the third battery terminal extends along a third axis, the third terminal end in a third plane perpendicular to the third axis, a gap being defined between the third plane and one of the first plane and the second plane.

13. The battery as set forth in claim 11, further comprising a temperature monitoring device electrically connected to the third battery terminal.

14. A battery comprising:
    a housing;
    a battery cell supported by the housing, the battery cell having a positive terminal and a ground terminal;
    a first terminal electrically connected to the positive terminal and having a first terminal end; and
    a second terminal electrically connected to the ground terminal and having a second terminal end, the second terminal end extending a distance beyond the first terminal end to couple the second terminal end to a battery charger before the first terminal end is coupled to the battery charger.

15. The battery as set forth in claim 14, further comprising a third terminal electrically connected to the battery cell and having a third terminal end.

16. The battery as set forth in claim 15, wherein the second terminal end extends a distance forwardly of the third terminal end.

17. The battery as set forth in claim 15, further comprising a temperature monitoring device electrically connected to the third terminal.

* * * * *